United States Patent
Bianciardi

(10) Patent No.: US 9,507,243 B2
(45) Date of Patent: Nov. 29, 2016

(54) UNDERWATER CAMERA SYSTEM AND ASSEMBLY

(71) Applicant: E-EYE, INC., Naples, FL (US)

(72) Inventor: Giancarlo Bianciardi, Mexico (MX)

(73) Assignee: E-Eye, Inc., Naples, FL (US)

( * ) Notice: Subject to any disclaimer, the term of this patent is extended or adjusted under 35 U.S.C. 154(b) by 0 days.

(21) Appl. No.: 14/693,509

(22) Filed: Apr. 22, 2015

(65) Prior Publication Data

US 2016/0178993 A1  Jun. 23, 2016

Related U.S. Application Data

(60) Provisional application No. 62/094,422, filed on Dec. 19, 2014.

(51) Int. Cl.
| | |
|---|---|
| *G03B 17/08* | (2006.01) |
| *A01K 91/06* | (2006.01) |
| *A01K 97/12* | (2006.01) |
| *H04N 5/225* | (2006.01) |

(52) U.S. Cl.
CPC .............. *G03B 17/08* (2013.01); *A01K 91/06* (2013.01); *A01K 97/125* (2013.01); *H04N 5/2252* (2013.01); *H04N 5/2257* (2013.01)

(58) Field of Classification Search
CPC .... G03B 17/08; A01K 91/06; A01K 97/125; H04N 5/2252; H04N 5/2257
See application file for complete search history.

(56) References Cited

U.S. PATENT DOCUMENTS

| | | | |
|---|---|---|---|
| 4,227,479 A | 10/1980 | Gertler et al. | |
| 6,065,123 A | 5/2000 | Chou et al. | |
| 6,262,761 B1 | 7/2001 | Zernov et al. | |
| 8,120,650 B2 | 2/2012 | Laser | |
| 8,437,630 B2 | 5/2013 | Wessner | |
| 8,515,269 B2 | 8/2013 | Londeree et al. | |
| 8,654,189 B1 | 2/2014 | Spangler et al. | |
| 2002/0003584 A1 | 1/2002 | Kossin | |
| 2007/0128970 A1 | 6/2007 | Mietta et al. | |
| 2008/0084496 A1 | 4/2008 | Vasilescu et al. | |
| 2009/0207020 A1* | 8/2009 | Garnier | G08B 21/12 340/541 |
| 2010/0007148 A1 | 1/2010 | Davis et al. | |
| 2011/0228075 A1 | 9/2011 | Madden et al. | |
| 2013/0051779 A1 | 2/2013 | Londeree et al. | |

(Continued)

FOREIGN PATENT DOCUMENTS

| | | |
|---|---|---|
| GB | 1587233 | 4/1981 |
| WO | 2004020283 | 3/2004 |
| WO | 2008111927 | 9/2008 |

(Continued)

OTHER PUBLICATIONS

Kuch et al., "Underwater Navigation and Communication: A Novel GPS/GSM Diving Computer", Aug. 2009, the European Underwater and Baromedical Society, Aberdeen, pp. 1-4.*

*Primary Examiner* — Peter D Le
(74) *Attorney, Agent, or Firm* — Hahn Loeser & Parks, LLP

(57) ABSTRACT

Disclosed is an underwater camera including a waterproof housing comprising a main body configured to contain a camera and a lens aperture for a lens of the camera. A line attachment system is configured to secure the waterproof housing to a continuous filament, such as a fishing line, such that the underwater camera is capable of sliding along the continuous filament.

41 Claims, 15 Drawing Sheets

(56) References Cited

U.S. PATENT DOCUMENTS

2013/0107031 A1 5/2013 Atkinson
2014/0358483 A1 12/2014 da Rosa

FOREIGN PATENT DOCUMENTS

| WO | 2012037139 | 3/2012 |
| WO | 2015188832 A1 | 12/2015 |

* cited by examiner

Fluid velocity on symmetry plane

6 Knots

8 Knots

Fluid velocity on symmetry plane

10 Knots

12 Knots

Absolute pressure on case

2 Knots

4 Knots

Absolute pressure on case

6 Knots

8 Knots

Absolute pressure on case

10 Knots

12 Knots

Constrained streamlines on case

2 Knots

4 Knots

Constrained streamlines on case

6 Knots

8 Knots

Constrained streamlines on case

10 Knots

12 Knots

UNDERWATER CAMERA SYSTEM AND ASSEMBLY

CROSS-REFERENCE TO RELATED APPLICATIONS

This application claims priority to U.S. Provisional Patent Application No. 62/094,422, filed on Dec. 19, 2014, which is incorporated by reference in its entirety.

BACKGROUND AND SUMMARY

The present invention relates to a system and camera assembly for recording images and video underwater. More specifically, the invention relates to a system and assembly including a camera attachable to a fishing line for digitally capturing, recording, and transmitting image, video, audio, and other data.

A variety of underwater fishing cameras for recording fish catches have been developed and used by amateur and professional sportsmen. These cameras are usually either independent or require in-line attachment to a fishing line.

Independent underwater cameras, those that are not attached to a fishing line, require a bulky trailing cable connecting the underwater camera to a computer or other recording or display device on the surface. Data recorded from the underwater camera is transmitted through the cable connection and displayed or recorded on the surface device. The cable may also be used to transmit power to the underwater camera. The camera and cable tend to be bulky and are not easy to control, making it difficult to position the underwater camera near the fishing line for an accurate shot. More accurate shots can be recorded by providing a fishing camera that is attached to the fishing line.

In commercially available in-line underwater cameras the fishing line must be cut to attach the underwater camera to the line. There are no known fishing cameras that can be selectively attached or removed from a continuous filament, such as a fishing line, without cutting the line. While it is possible to attach an underwater fishing camera to a fishing line, it is often not done because the additional weight of the fishing camera on the line may weigh down the line and change the behavior of the bait or lure on the trailing line. This may be undesirable for professional sports fishermen. There is recognized a need in the art for an underwater fishing camera that overcomes the deficiencies of the prior art.

Commercially available underwater fishing cameras also suffer from a lack of power. Independent cameras need to have a power cable connected to them in order to receive power and continue to record. If a camera is not connected to a steady power source, the camera is limited by the life of the battery within the camera housing. It would be preferable for a camera to be able to generate electricity when in use, so that camera life is not limited and a continuous power supply is not required.

The present invention overcomes these and other deficiencies in the prior art.

Disclosed in this application is an underwater camera comprising a camera having a lens; a water proof housing comprising a main body configured to contain the camera and having a lens aperture for the lens of the camera; and a line attachment system configured to secure the water proof housing to a continuous section of a filament such that the underwater camera is capable of sliding along the continuous filament. The water proof housing of the first embodiment may be configured to be pulled through the water in a first direction and the lens aperture is oriented in a second direction opposite the first direction. The continuous filament of the first embodiment may be a fishing line. The main body of the first embodiment may be monolithic and form a sealed enclosure for the camera.

An embodiment of the invention may also include a line attachment system along the top of the waterproof housing. The line attachment system comprises at least two clamps configured to secure the underwater camera to the continuous filament. The two clamps comprise a hook configured to receive the continuous filament in an open position and an elastic clip configured to secure the hook in a closed position to retain the continuous filament. The two clamps may be connected to the main body of the waterproof housing. Finally, the at least two clamps may comprise a first clamp connected to a cap configured to be secured to the water proof housing and a second clamp connected to a back frame assembly configured to be secured to the water proof housing opposite the cap.

An embodiment of the invention may also include a line attachment system along the bottom of the waterproof housing. The line attachment system comprises a line channel extending along at least a portion of the length of the main body, the line channel configured to receive the continuous filament. Further, a sled is configured to be slideably received in the line channel to secure the underwater camera to the continuous filament.

An embodiment of the invention may also include a cap mount secured to the water proof housing. The water proof housing may comprise a threaded connector configured to receive the cap. The cap may have a hydrodynamic profile configured to facilitate the movement of the camera under water.

An embodiment of the invention may also include a back frame assembly configured to be secured to the water proof housing adjacent the lens aperture of the main body. The frame assembly may be further configured to support an accessory over the lens aperture. The frame assembly is further configured to support a filter over the lens aperture of the main body to filter light incident upon the lens of the camera.

An embodiment of the invention may also include various hydrodynamic performance requirements. In one aspect, the water proof housing is water proof to at least 100 meters. In another, the water proof housing is stable at 12 knots. In yet another, the underwater camera is stable at a speed of 12 knots when submerged. Finally, the underwater camera has a neutral effect on a fishing lure secured to an end of the continuous filament at a speed of 12 knots when submerged.

An embodiment of the invention may also include various alternative center board accessories. A centerboard may extend from the main body and be configured to stabilize the underwater camera when moving through the water. The centerboard may include an adjustable weight. The centerboard may be removably attached to the main body. The centerboard may be adjustable along a length of the main body. The main body may further comprise a rail extending along at least a portion of the length of the main body, the rail configured to secure the center board to the main body such that the centerboard is adjustable along the rail length. The rail may further comprise a line channel configured to receive the continuous filament, the centerboard configured to secure the continuous filament in the line channel such that the underwater camera is secured to the continuous filament.

An embodiment of the invention may also include a generator capable of automatically recharging the power source of the camera. The underwater camera may further include a rechargeable energy storage device within the waterproof housing and operatively connected to the camera and a generator configured to generate electricity responsive to movement of the system through a fluid to charge the rechargeable energy storage device. The generator includes at least one stator within an interior of the water proof housing and operatively connected to the rechargeable energy storage device and at least one rotor exterior to the water proof housing, wherein the rotor is magnetically coupled to the stator.

An embodiment of the invention may further include various camera operation features. In one aspect, a processor is provided that includes instructions configured to control operation of the camera and other electronic devices within the waterproof housing. A memory is also provided, in communication with the processor, and configured to store captured images or video from the camera as recorded data. The underwater camera may also include an optical transmitter configured to transmit the recorded data to an optical receiver external to the waterproof housing. Further, the underwater camera may include a magnetically operated switch operatively connected to the processor and configured to activate or deactivate t he camera responsive to the proximity of a magnet. The underwater camera may also include a light sensor for detecting ambient light and a light source configured to illuminate at least a portion of a viewing angle of the lens of the camera responsive to detecting ambient light below a threshold. Finally, the underwater camera may include a microphone, the memory configured to store captured audio data from the microphone as recorded data.

An embodiment of the invention may also include instructions in the processor configured to save an operational state of the camera prior to a power loss and restore the operational state of the camera and resume recording after power is restored.

An embodiment of the invention may also include a 3-axis sensing and GPS system. In one aspect, the processor includes instructions configured to determine a position of the underwater camera using a geolocation device when the underwater camera is out of the water and a three-axis accelerometer when the underwater camera is submerged. The geolocation device may be a Global Positioning System receiver. In another aspect the underwater camera may include a three-axis accelerometer operatively connected to the processor and configured to detect acceleration in three directions. The processor may include instructions configured to identify fish strikes responsive to the detected acceleration and annotate the captured images or video with a time and date responsive to the identified fish strikes. The processor may also include instructions configured to trigger recording of captured images or video from the camera responsive to detected acceleration. The processor may also include instructions to determine a path of travel of the underwater camera based upon detected acceleration.

An embodiment of the invention may also include a separate, "tournament" mode for the underwater camera to be operated in. In this second mode, the processor may include instructions to receive a unique identifier, time and date settings, and an expiration time; annotate captured images and videos with the unique device identifier and a current time and date until the expiration time; and prevent annotation of captured images and videos with the unique device identifier if the instructions are altered prior to the expiration time. Alternatively or in addition, the processor may include instructions configured to prevent the underwater camera from accepting new instructions until after the expiration time.

Finally, in another embodiment of the invention an auto recharge generator system is described. This system includes a waterproof housing, an electrical device within the waterproof housing, a rechargeable energy storage device within the waterproof housing and operatively connected to the electrical device, and a generator configured to generate electricity responsive to movement of the system through a fluid to charge the rechargeable energy storage device. The system may also include at least one stator disposed within an interior of the waterproof housing and operatively connected to the rechargeable energy storage device and at least one rotor exterior to the water proof housing, the rotor magnetically coupled to the stator. The system may include a first rotor configured to rotate in a first direction and a second rotor configured to rotate in a second direction opposite the first direction. The system may further include a cap configured to be secured to the water proof housing and the rotor is disposed within the cap exterior to the waterproof housing. The system may also include at least one fluid intake configured to direct a fluid across the rotor as the system moves through the fluid to operate the electric generator to charge the rechargeable energy storage device. The electrical storage device may be, for example, an underwater camera.

DETAILED DESCRIPTION

Disclosed in this application is an underwater camera assembly including a main body and separately detachable front cap, back frame accessory, and centerboard extending away from the main body. One or more line attachment features are disposed on one or more of the main body, front panel, back frame accessory, or centerboard that allows the underwater camera assembly to attach to a continuous filament (such as a fishing line) without breaking the line. A camera disposed within the main body faces out of a lens aperture to record images and video, preferably in a direction opposite the direction of travel.

Figure 1:
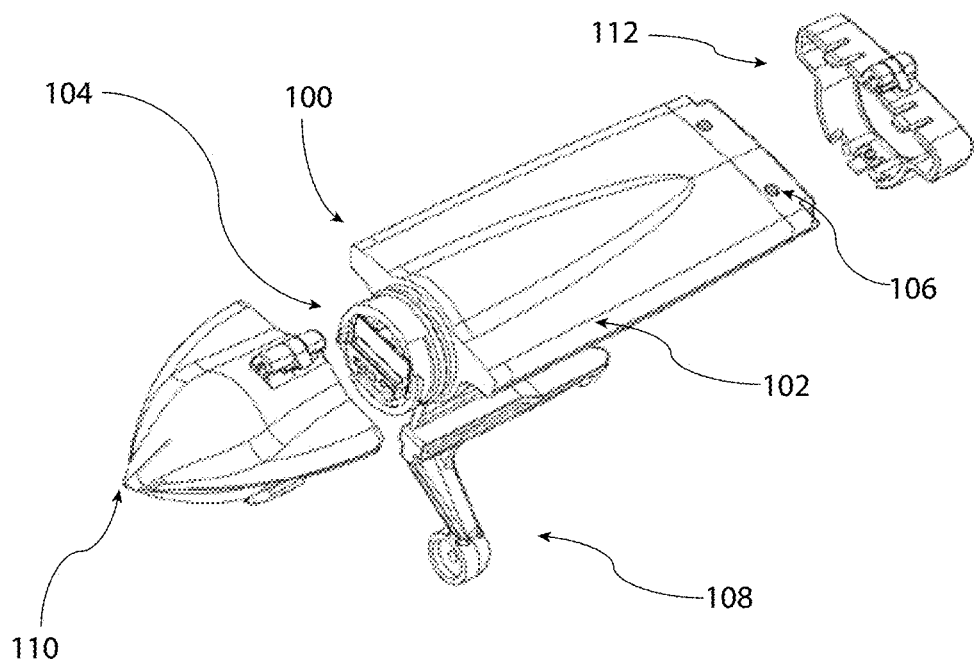
FIG. 1 is an exploded top perspective view of an embodiment of an underwater camera.

Shown in FIG. 1 is a top perspective exploded view of the underwater camera assembly 100 according to one aspect of the disclosure. The underwater camera assembly 100 includes a main body 102 with a front panel 104 and back frame accessory bay 106. The back frame accessory bay 106 preferably includes a clear window. A camera disposed within the main body 102 includes a lens for capturing images and video through a lens aperture positioned for recording through the back frame accessory bay 106. A centerboard 108 extends away from the main body 102. Attachable to the front panel 104 of the main body is a front cap 110. Attachable to the back frame accessory bay 106 is a back frame accessory 112.

The front cap 110 and back frame accessory 112 are designed to be removable to facilitate various alternative features. In one example, the front cap 110 includes a generator for generating electricity while the assembly 100 is drawn through the water. In further examples, the back frame accessory 112 may be fitted with various lenses, including an infrared lens, colored lenses, a fish-eye lens, or a darkened lens to filter out high ambient light.

Figure 2:
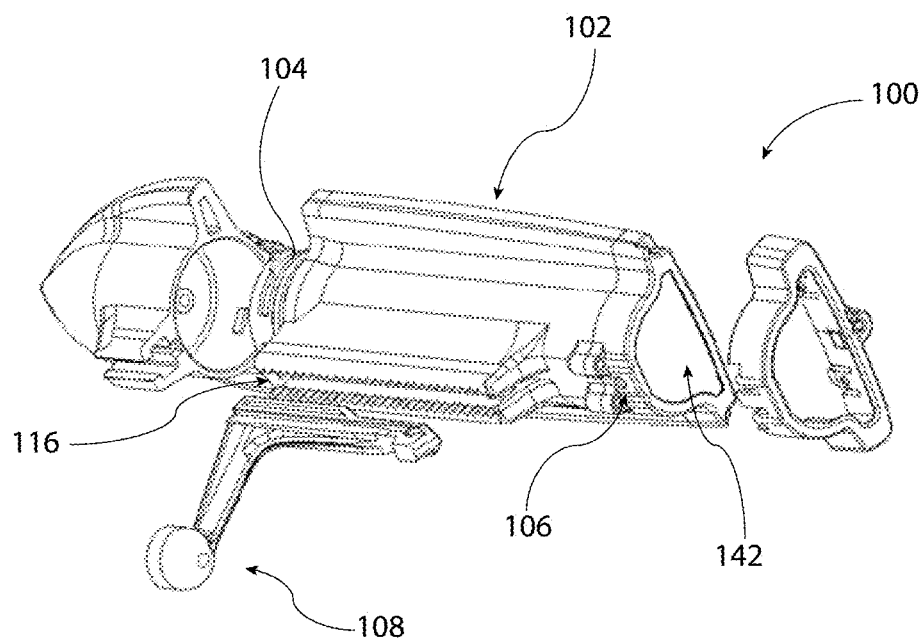
FIG. 2 is an exploded bottom perspective view of an embodiment of an underwater camera.

Shown in FIG. 2 is a bottom perspective exploded view of the underwater camera assembly 100. The back frame accessory bay 106 may include a window 142 that serves as the lens aperture for a camera within the main body. The centerboard 108 is coupled to the main body 102 at a bottom rail 116. Lights may also be disposed within the main body to shine out of the window 142 so as to illuminate the area within the camera's field of view.

Figure 3:
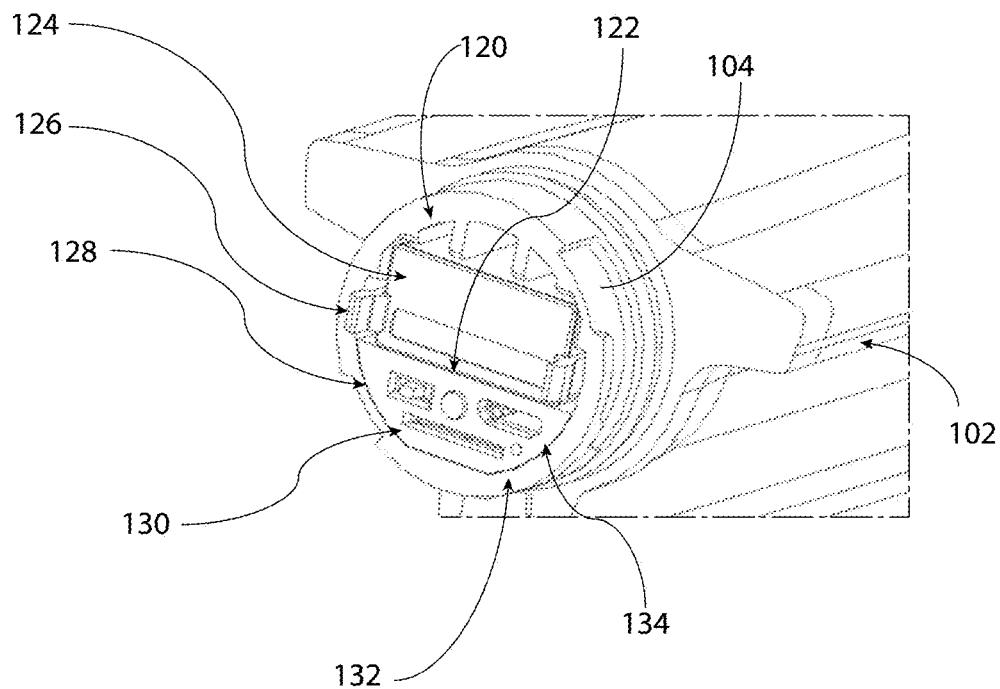
FIG. 3 is a perspective view of the front panel.

The front panel 104 is shown in further detail in FIG. 3. According to the illustrated embodiment, the front panel 104 includes a user interface (UI) 120 which may include, without limitation, a UI button 122, a battery 124, battery clamps 126, a LED lighting control switch 128, a memory card slot 130, a UI LED 132, and a cable connector 134.

Figure 4:
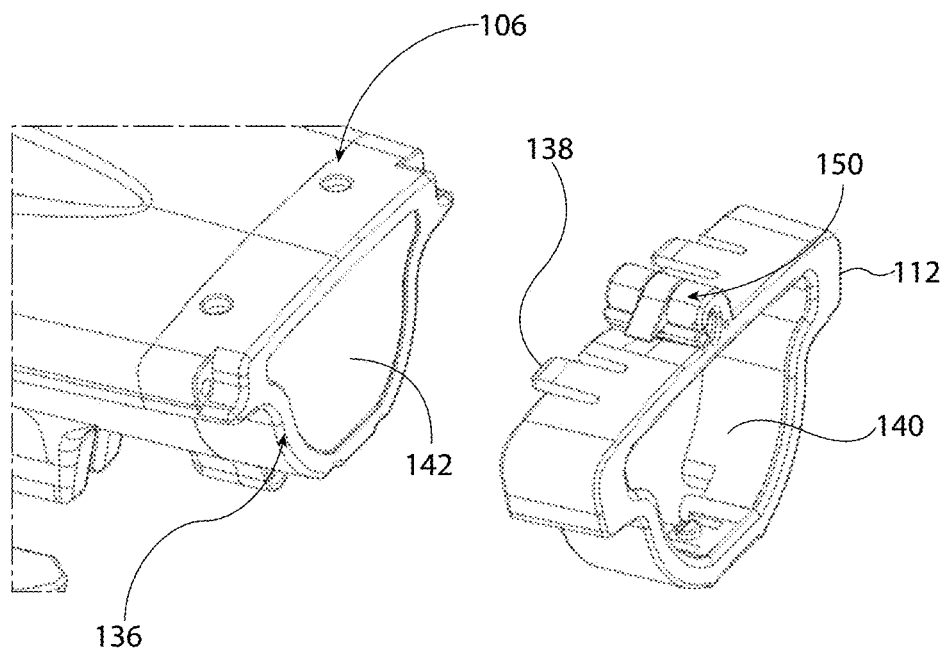
FIG. 4 is a perspective view of the back frame.

The back frame accessory bay 106 is shown in further detail in FIG. 4. The back frame accessory bay 106 includes a back frame 136 for aligning the back frame accessory 112 to the back frame accessory bay 106. Connection means 138, such as a latch system, is provided for coupling the back frame accessory 112 to the back frame accessory bay 106. The back frame accessory 112 may include one or more filters 140 for filtering light entering the window 142.

As further illustrated in FIG. 1, the main body 102 and front cap 110, when combined, have a hydrodynamic profile allowing the underwater camera assembly 100 to pass through the water with reduced resistance and self-orient in a first direction where water passes over the front cap 110 towards the back frame assembly 112. This orientation of the assembly 100 positions the window 142 (as illustrated in FIG. 2) in the back frame accessory bay 106 to face opposite the direction of travel so that the camera records images and video opposite the direction of travel. It is also contemplated that an alternative front cap 110 and back frame accessory 112 may be provided that allows the assembly 100 to self-orient in a second direction, opposite the first direction, as it moves through the water so as to record video and images in the direction of travel.

The profile of the combined main body 102 and front cap 110 is also preferably stable at up to 12 knots to prevent the main body 102 from twisting as it is pulled through the water in a first direction at appropriate speeds. The assembly 100 is considered stable when the assembly experiences minimal variation and torque about the filament as the assembly 100 is pulled in the direction of travel. The hydrodynamic stability of the assembly 100 is for both submerged and partially submerged cases. The assembly 100 further has a neutral effect on a fishing lure secured to an end of the continuous filament at a speed of 12 knots when submerged, i.e. the net lift on the assembly 100 is zero at the selected speed. Different arrangements of the front cap 110, back frame accessory 112, and centerboard 108 may allow for stabilization and neutral effect at different speeds, ranging from 2-15 knots.

Contained within the main body 102 of the underwater camera assembly 100 is a camera (not shown) having a lens where the lens faces towards a lens aperture, such as the window 142 on the back frame 136. This allows the camera to record images and video through the back frame 106. When the underwater camera assembly 100 is pulled through the water in a first direction, the lens of the camera will be pointing in a second direction opposite the first direction, allowing images and video to be captured opposite the direction of travel. In a typical arrangement where the assembly 100 is attached to a fishing line, it will be desired to capture images and data from the hook and lure at the trailing end of the fishing line. This first arrangement allows the camera to capture the motion of the lure and record a fish strike. In other arrangements, the assembly 100 may be arranged to point in the first direction, allowing images and video to be captured in the direction of travel.

Also contained within the main body 102 is a processor containing instructions for controlling operation of the camera and other electronic devices within the waterproof housing. The other electronic devices may include, without limitation: digital memory storage for storing recorded video or captured images; an optical transmitter for transmitting recoded data to an optical receiver external to the waterproof housing; a magnetically operated switch to activate or deactivate the camera in response to the proximity to a magnet; a light sensor to detect ambient light levels; a light source to illuminate a portion of a viewing angle of the lens of the camera; a microphone for capturing audio data; geolocation sensors (such as a Global Positioning System receiver); three-axis accelerometer for measuring the motion of the assembly; gyroscope for measuring the orientation of the assembly; and wireless transmitters and/or receivers. Various features and functions are accomplished by the inclusion of the above-listed components.

In one feature, digital memory storage allows the camera to maintain its settings after being powered off without requiring manual reprogramming. This allows the camera to be powered down when not in use and quickly booted to a ready state to take photographs.

In a second feature, the built-in digital memory storage allows the camera to record image and video data to the digital memory without requiring the data to be transmitted to a remote capture device, either wirelessly or through a cable.

In a third feature, an optical transmitter may be an infrared transmitter for quickly transmitting data from the camera to an outside capture device. This allows data on the camera to be accessed without a wired connection. The lack of a requirement for a wired connection prevents water contamination of the port where the wired connection is made.

In a fourth feature, the magnetically operated switch allows the camera to be enabled or disabled remotely without requiring operation of a manual switch. This allows the unit to be sealed with no mobile parts or junctions, and allows operation of the switch with wet hands, with gloves, underwater, or in any other severe condition without the need to remove the front cap. This magnetic switch may serve the same function as an internal user-interface button.

In a fifth feature, the light sensor communicates with the processor, camera, and lights to measure the amount of ambient light in an area. A low light environment may automatically signal the lights to increase in brightness, further illuminating the target area. Alternatively, the light sensor may be manually overridden by a wireless signal to signal the lights to produce a higher or lower degree of ambient lighting as desired.

In a sixth feature, the camera includes a light source that illuminates the viewing area in response to a signal from the processor and/or the light sensor. The light source may be white light from an LED, or may be an infrared light or other type of lighting. The light source may be filtered by the back frame accessory. Alternatively, the light may be configured to blink or otherwise operate in other than a steady state mode. In one example, the light may intermittently flash when battery power is low.

In a seventh feature, the camera includes a microphone for capturing audio data, such as subsonic noise generated by underwater wildlife. Alternatively, the camera may capture audio data within the hearing range to add more dynamicity to the recorded video, such as a fish strike.

In an eighth feature, the camera includes geolocation sensors and a three-axis accelerometer for accurately determining the position of the camera in three dimensions. When the assembly is outside the water, the geolocation (GPS) sensor may communicate with a satellite or local computer to determine its location. When the camera is underwater, accelerations in any direction are determined by the three-axis accelerometer. By measuring the amount of acceleration and time between accelerations, the processor can accurately determine the precise location of the camera to within a narrow range. Further, this information may be captured in real time, making it possible to reconstruct the path that the camera took while underwater.

In a ninth feature, the three-axis accelerometer may also be used to determine the presence of a fish strike on the line and signal the camera to begin capturing video, image, and/or sound data. When a strike is detected, captured video and images may be annotated with the time, date, and location of the strike. The three-axis accelerometer may also be used to signal other events, such as the camera entering the water during a cast or the camera being removed from the water.

In a tenth feature, the camera may include an electronic gyroscope for determining the orientation of the assembly when it is underwater. This electronic gyroscope can provide data concerning the orientation of the camera and associate that data with the video recording. By combining these values, the recorded images or video can be stabilized and oriented during video editing.

In an eleventh feature, the camera includes a wireless transmitter and receiver that allows for communication between the camera and a remote computing device when the camera is submerged or out of the water. This allows the camera to communicate with the remote computing device without requiring the waterproof exterior of the assembly to be breached. This allows the user to collect and analyze data while in an environment without risk of water contamination of the camera.

In a further aspect of the invention, the processor may include separate "amateur" and "professional" settings. In an amateur setting, the camera may be interfaced with by a user to access all of the data captured and stored by the camera and processor. The user may be able to select various options such as continually capturing video, capturing images when a fish strike is detected, plotting the path of the camera, or any other features. In a professional setting, the underwater camera may be locked to only accept certain instructions and return certain data depending on the time or a security key provided to the processor. For example, a fishing tournament may provide a security key to the processor that instructs the processor to capture images in response to a fish strikes and annotate them with a date, time, and position stamp. The processor may be locked to prevent users from modifying this data until a predetermined period has expired representing the length of the tournament.

The processor may be interacted with by a user through the user interface 120, allowing a user to replace the battery 124, adjust lighting or other camera settings, and upload or download information either from an SD card or through a USB connection. Alternatively, the camera may include a wireless transmitter and receiver enabling remote wireless communication with a device. The wireless communication may be Bluetooth, radio, wi-fi, or other well-known wireless communications protocol and the device may be a personal computer, such as a laptop, smartphone, or other computing device. This wireless transmitter may also allow the user to remotely adjust the settings on the camera without requiring direct or wired interface with the user interface 120.

The underwater camera assembly 100 is designed to have an exterior waterproof to at least 100 m, preventing water from entering the main body and causing damage to the camera contained therein when submerged. In one embodiment, the main body 102 is watertight, comprising a smooth exterior. The main body 102 may be formed of a two-part plastic shell allowing the camera to be installed within the main body 102, with the two-part plastic shell secured by fasteners, adhesive, ultrasonic welding, or other well-known techniques for forming a watertight seal. In this embodiment, the main body 102 may omit the user interface 120 and interface between the camera and a device may only be accomplished by wireless communication. Alternatively, the main body 102 may be a monolithic body, such as an injection molded plastic form having a single opening for receiving the camera and internal components. The single opening may be the front panel 104 that is covered by the front cap 110 to form a waterproof housing.

In another embodiment, the main body 102 may be waterproof except for the user interface 120 on the front panel 104. The user interface 120 is covered by the front cap 110 which is selectively secured to the front panel 104 using a waterproof seal. The assembly of the main body 102 and front cap 110 therefore provides a waterproof barrier for the camera and user interface 120. In one aspect of this embodiment the front cap 110 has a silica gel cartridge that forms a seal over the front panel 104 when the front cap 110 is secured to the main body 102.

Figure 5:
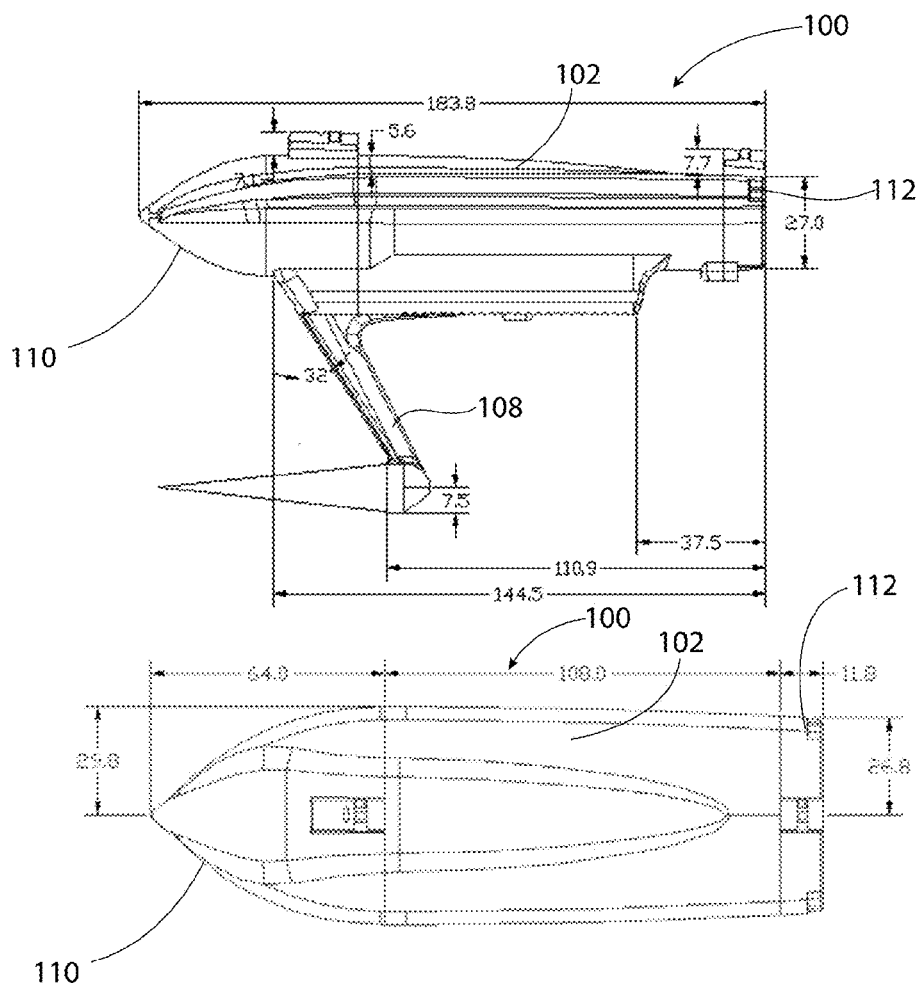
FIG. 5 is a plan view showing the top and side dimensions of the assembly.

FIG. 5 shows a side and top view of the assembly 100, showing the various dimensions of the main body 102 according to one embodiment.

Figure 6:
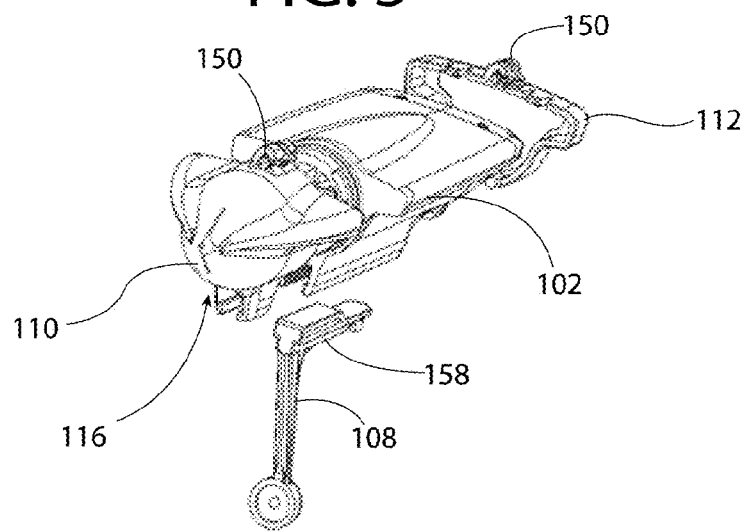
FIG. 6 is a front perspective exploded view of the assembly.

FIG. 6 shows a front exploded perspective view of the assembly 100 showing the positions of top and bottom line hooking systems.

Figure 7:
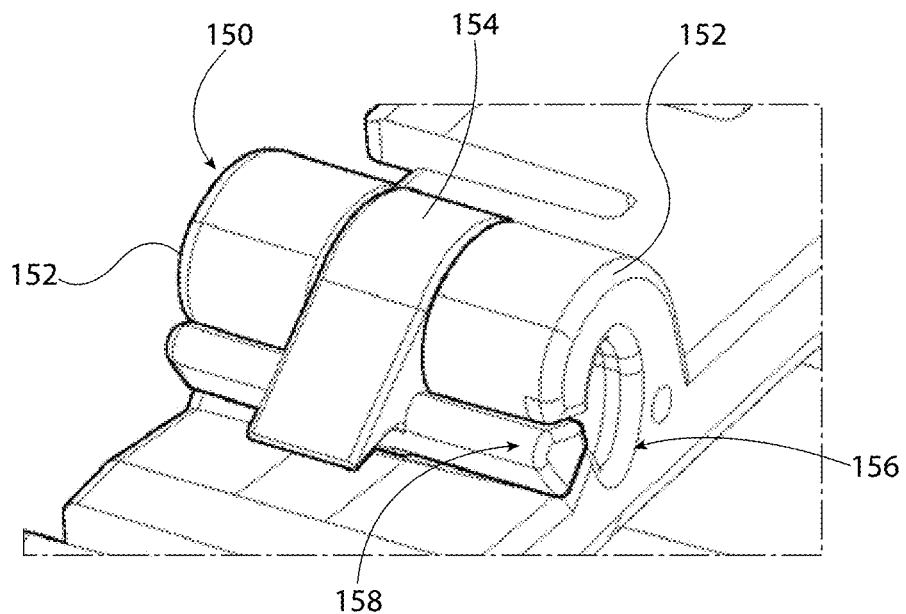
FIG. 7 is a perspective view of the top line holding system.

In a further aspect the underwater camera assembly 100 may include a line hooking system assembly 150, one example of which is shown in FIG. 7. In one aspect of the illustrated embodiment one line hooking assembly 150 is positioned on the front cap 110 and a second line hooking assembly is positioned on the back frame accessory 112. Alternatively, the main body 102 may include two separate and spaced apart line hooking assemblies 150.

The line hooking system assembly 150 shown in FIG. 7 includes one or more fixed clip(s) 152 and a movable elastic clip 154. The fixed clip(s) 152 may be fixed relative to the front cap 110 or back frame accessory 112 and include a channel 156 sized to accommodate a fishing line or other continuous filament (not shown). The channel may include a chamfer or rounded edge to prevent damage to the filament. The movable clip 154 includes an elastic channel shutter 158 and is pivotable relative to the fixed clips and is movable between an open position and a closed position. In the open position, the channel shutter 158 is open, allowing the fishing line or other filament to be positioned within the channel 156. In the closed position, the channel shutter 158 closes the channel 156, preventing the filament from being removed from the channel 156 while allowing the filament to slide along the channel 156.

With reference to FIG. 2, the underwater camera assembly 100 includes a detachable centerboard 108 connected to the underside of the main body 102. The centerboard 108 provides additional stability when the underwater camera assembly 100 is pulled through the water. The centerboard also has an adjustable weight, allowing the user to adjust the hydrodynamically neutral speed. The main body 102 will affect a slight lift when pulled through the water, counteracted by the weight of the assembly 100. At a predetermined speed, the lift will be offset by the weight, causing a neutral effect on a fishing lure secured to an end of the continuous filament. By adjusting the weight on the centerboard, the speed at which this neutral effect occurs can be adjusted. The centerboard 108 may also be adjustable along the bottom rail 116 and may provide a second method of attaching the underwater camera assembly 100 to a fishing line or other filament, as shown in FIG. 8.

Figure 8:
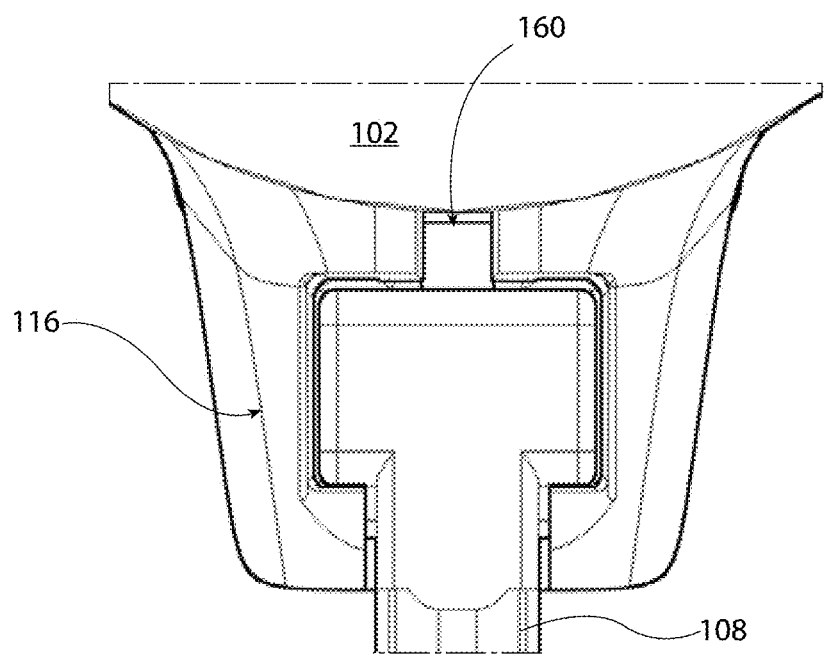
FIG. 8 is a plan view of the bottom line holding system.

With reference to FIG. 8, the centerboard includes a sled 158 that is held in place by the bottom rail 116 and slideable in one dimension relative to the main body 102. Formed between the sled 158 and main body 102 is a line channel 160 that can accommodate a fishing line or other continuous filament. The centerboard 108 can be removed from the main body 102 by sliding the sled 158 along the bottom rail 116 until the sled 158 is no longer contained by the rail 116. The fishing line or other filament can then be laid in the line channel 160 and the centerboard replaced. This arrangement allows the assembly 100 to slide along the fishing line or other continuous filament.

Figure 9:
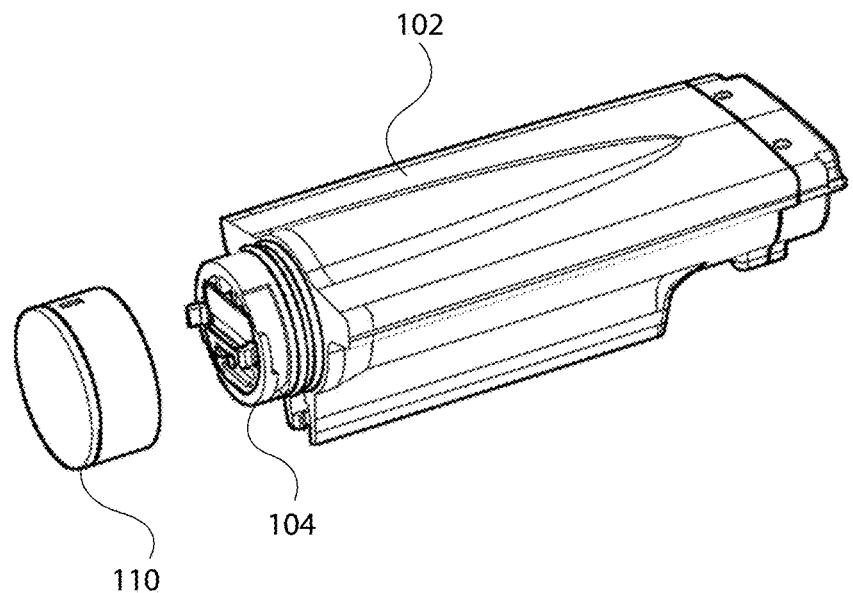
FIG. 9 is a side perspective view showing an alternative front cap arrangement.
Figure 10:
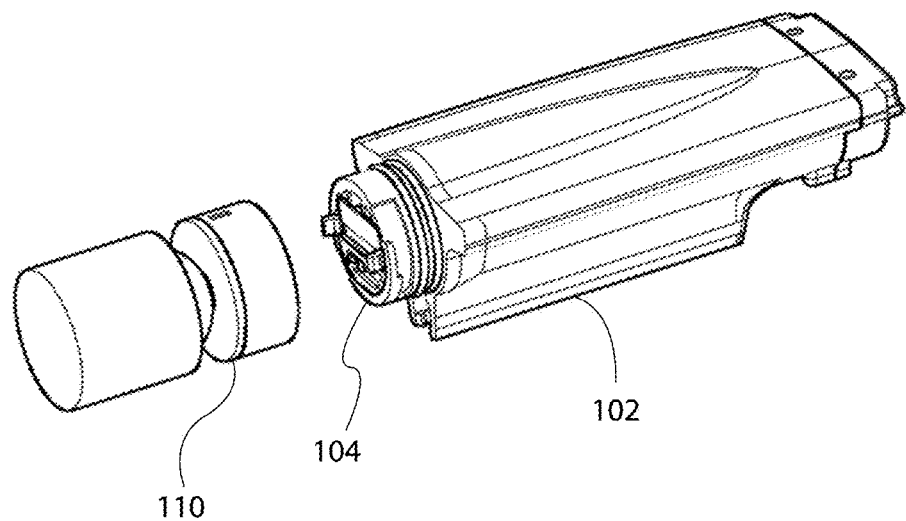
FIG. 10 is a side perspective view showing another alternative front cap arrangement.

Various other front cap arrangements are shown in FIGS. 9-10. In the arrangement shown in FIG. 9, the front cap 110 is a simple cap mount that covers the front panel 104. In the arrangement shown in FIG. 10, the front cap 110 includes a ball joint for attaching to a suction cup or other fastening system.

Figure 11:
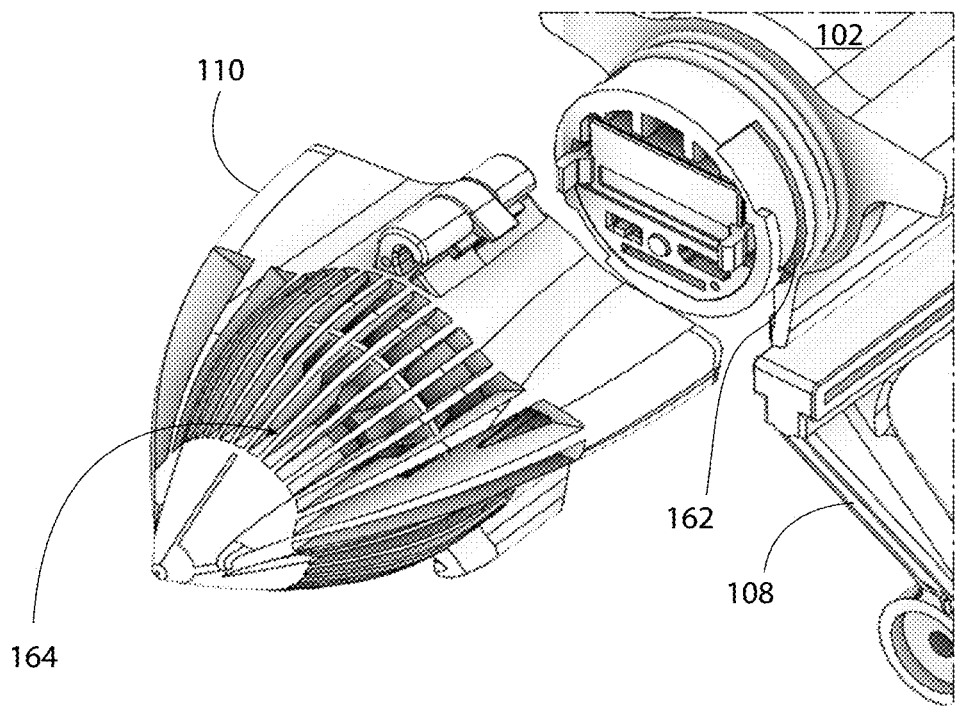
FIG. 11 is a perspective view of the front cap.

One optional version of the front cap 110 is shown in FIG. 11. As shown in this version, the front cap 110 is configured to be secured to the front panel 104 of the main body 102. The front panel 104 of the main body 102 includes a threaded connector 162 adapted to be received within a complementary structure on the front cap 110. The front cap 110 according to the illustrated version has a hydrodynamic profile configured to facilitate movement of the underwater camera under water.

Figure 12:
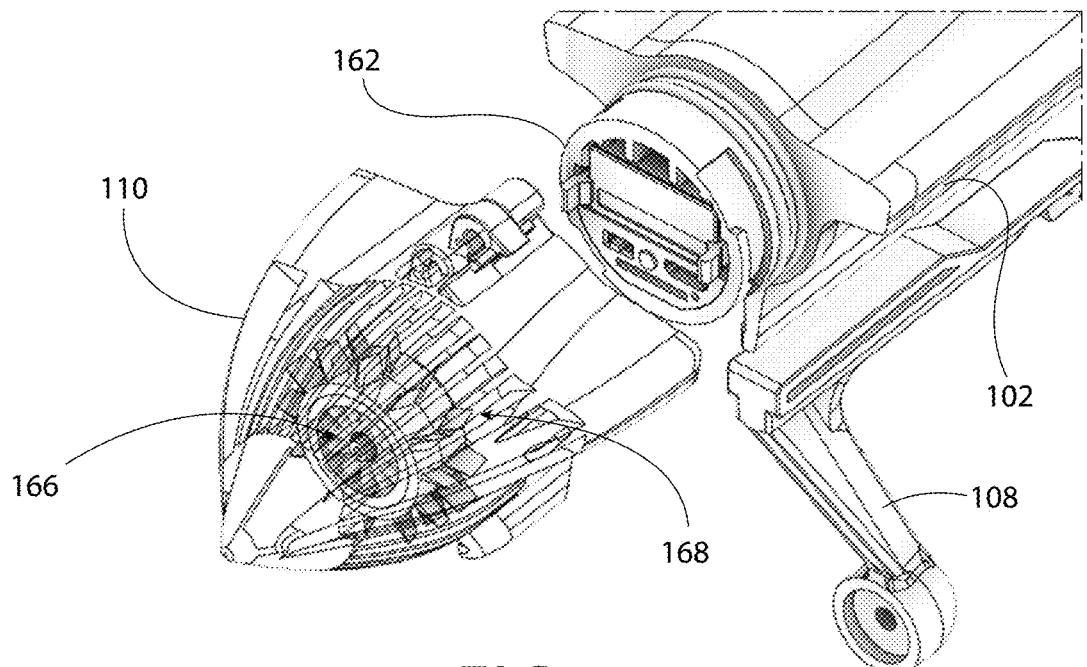
FIG. 12 is a perspective view of the cutaway front cap.

As further shown in FIGS. 7-8, the front cap 110 may include a generator for generating electricity responsive to movement of the assembly 100 through a fluid to charge a rechargeable energy storage device (battery) within the main body 102 and operatively connected to the camera. The generator assembly includes a flow intake case 164 that allows water to flow into the front cap 110. The flow intake case 164 preferably is configured to provide laminar flow. Within the front cap 110, shown in FIG. 12, one or more stators 166 and one or more rotors 168 is provided. As water flows through the flow intake case 164, the water causes the one or more rotors 168 to rotate relative to the stators 166, causing electricity generation according to well known principles. In a further aspect, the stators 166 are within the waterproof housing formed by the main body 102 and front cap 110 and the rotors 168 are outside the waterproof housing, the rotor and stators magnetically coupled through the waterproof barrier.

FIGS. 13-21 show various experimental features of the underwater camera at various speeds, ranging from 2-12 knots for a certain hydrodynamic profile.

Figure 13:
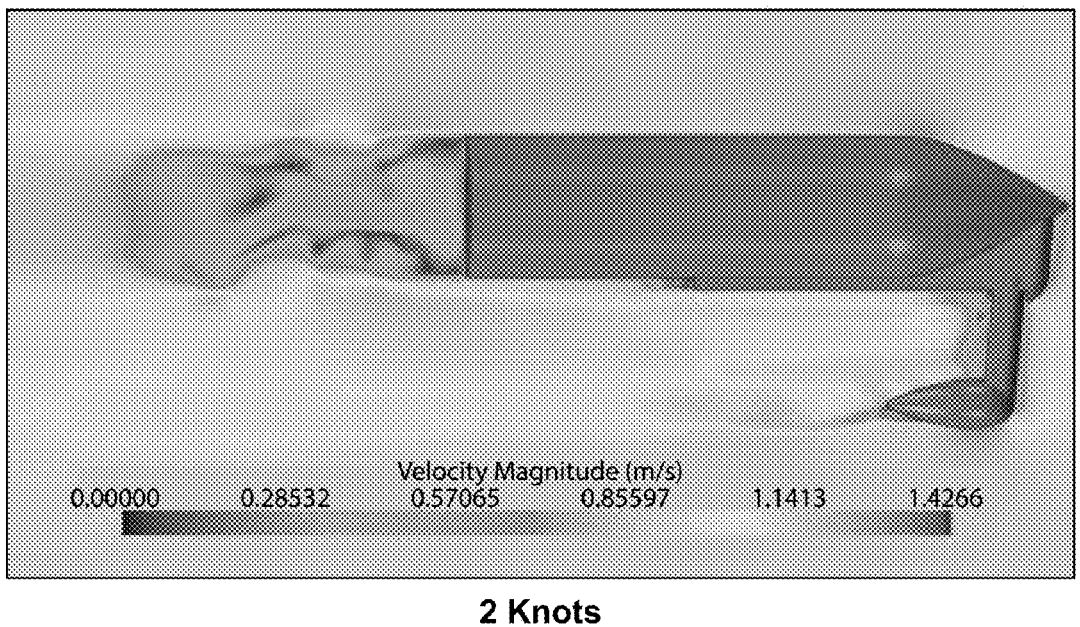
FIG. 13 is a side plan view showing fluid flow around the assembly at 2 and 4 knots.
Figure 13:
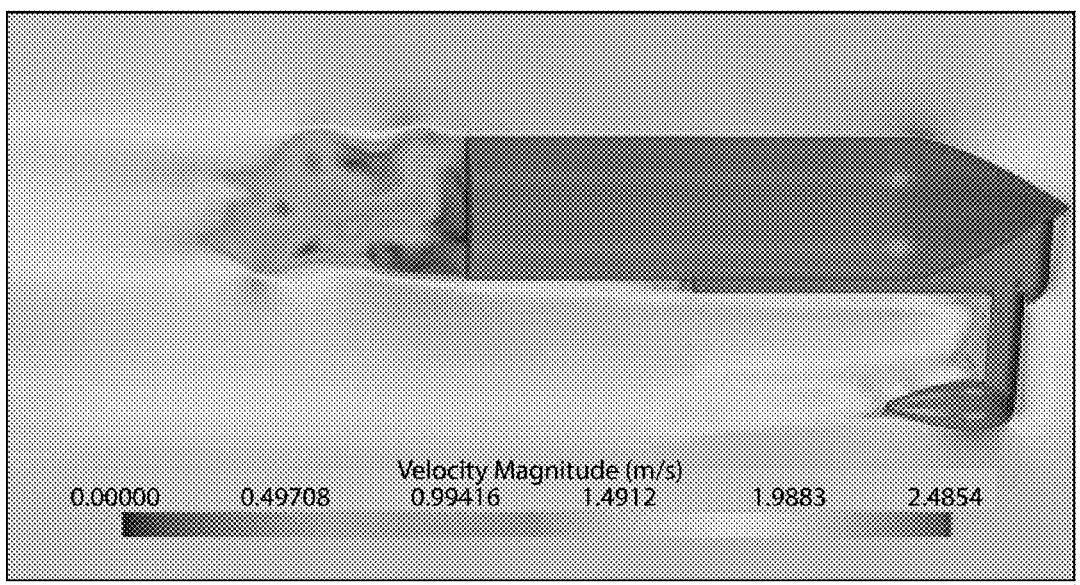
Figure 14:
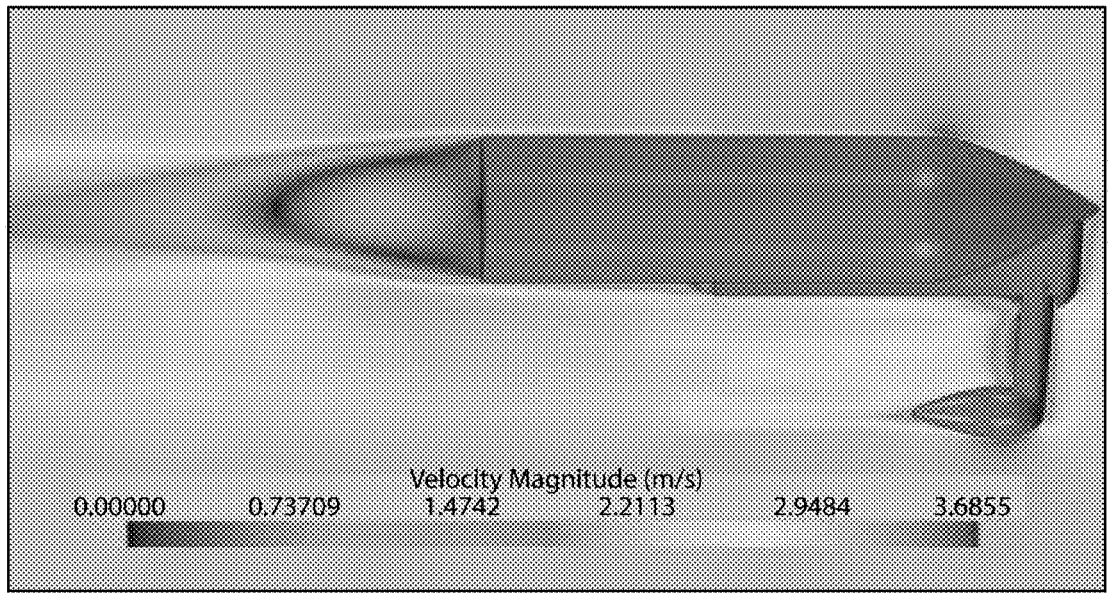
FIG. 14 is a side plan view showing fluid flow around the assembly at 6 and 8 knots.
Figure 14:
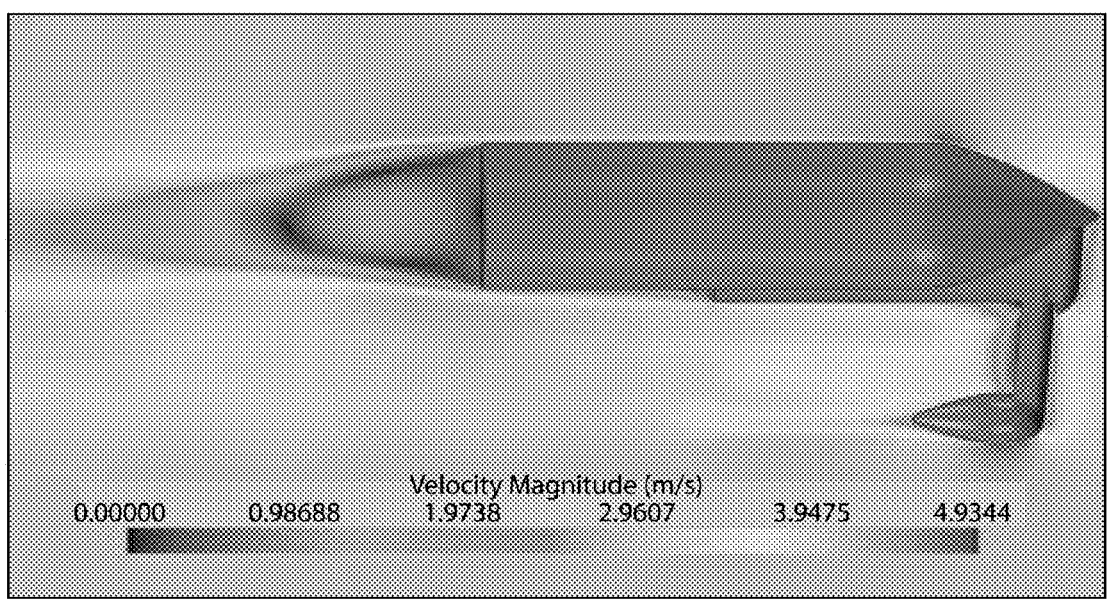
Figure 15:
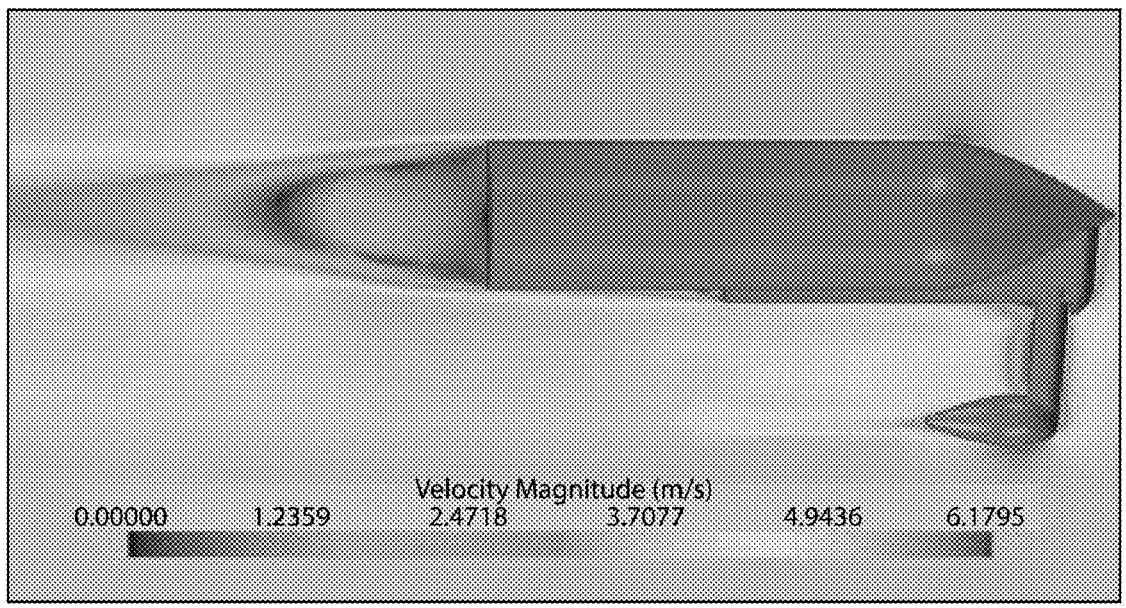
FIG. 15 is a side plan view showing fluid flow around the assembly at 10 and 12 knots.
Figure 15:
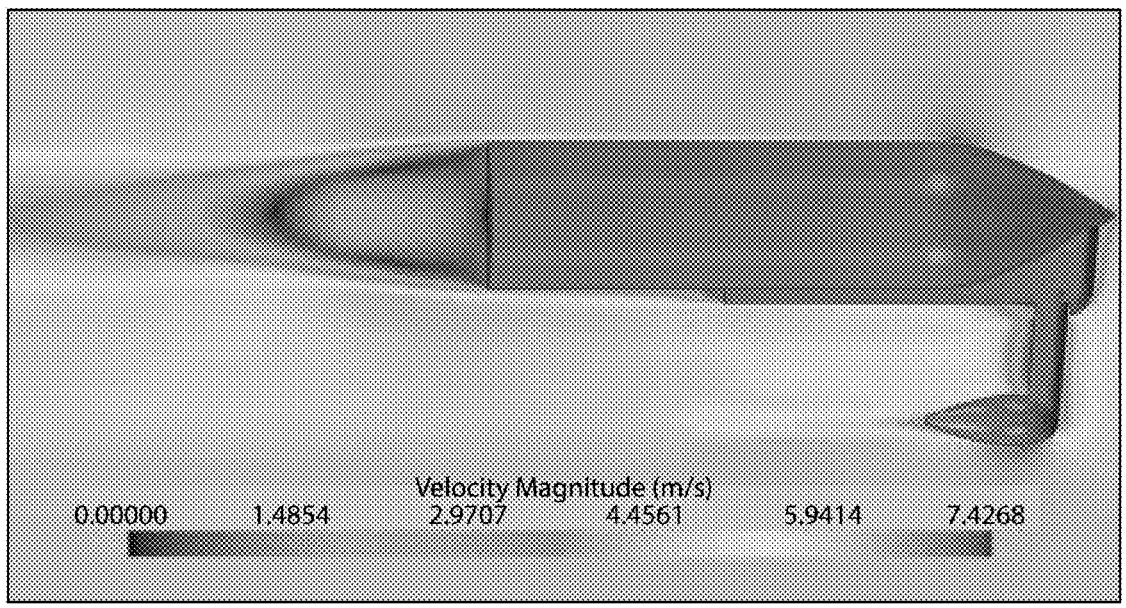

FIGS. 13-15 show the fluid velocity on a symmetrical plane. According to the hydrodynamic profile, the flow at the trailing end of the main body is turbulent below 6 knots, and tends to stabilize to laminar flow as the speed approaches 12 knots. This change from turbulent to laminar flow increases the stability and reduces drag on the body.

Figure 16:
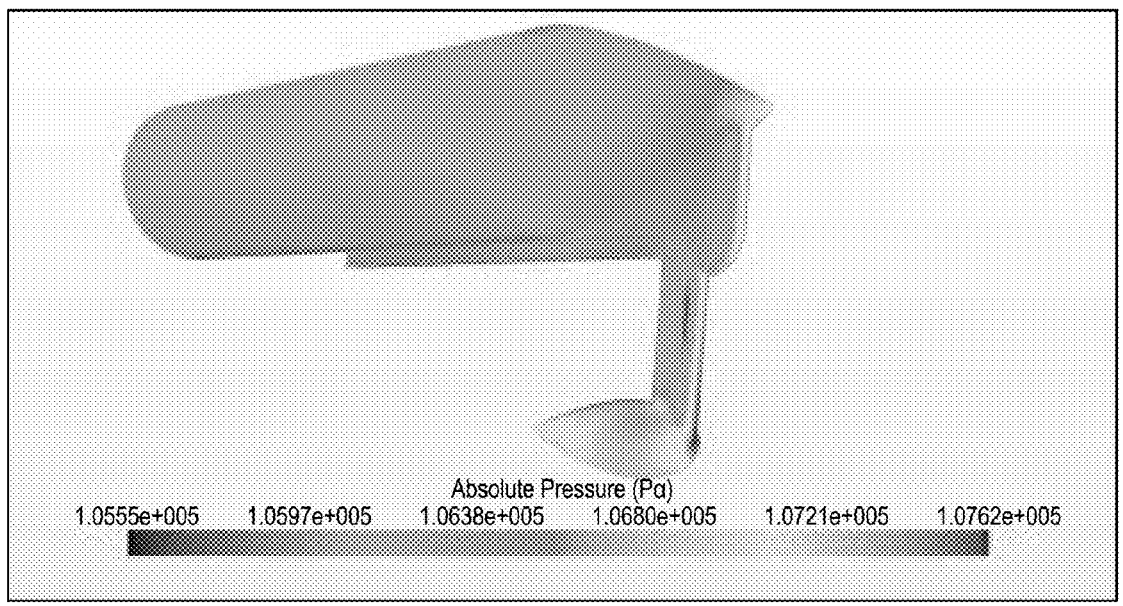
FIG. 16 is a perspective view showing the pressure on the case at 2 and 4 knots.
Figure 16:
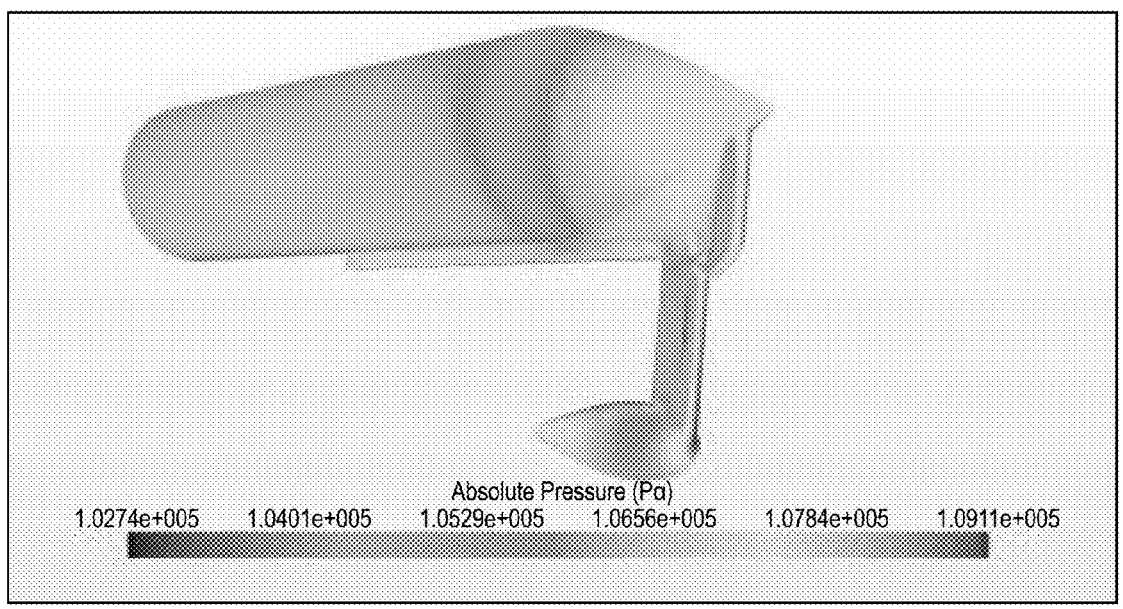
Figure 17:
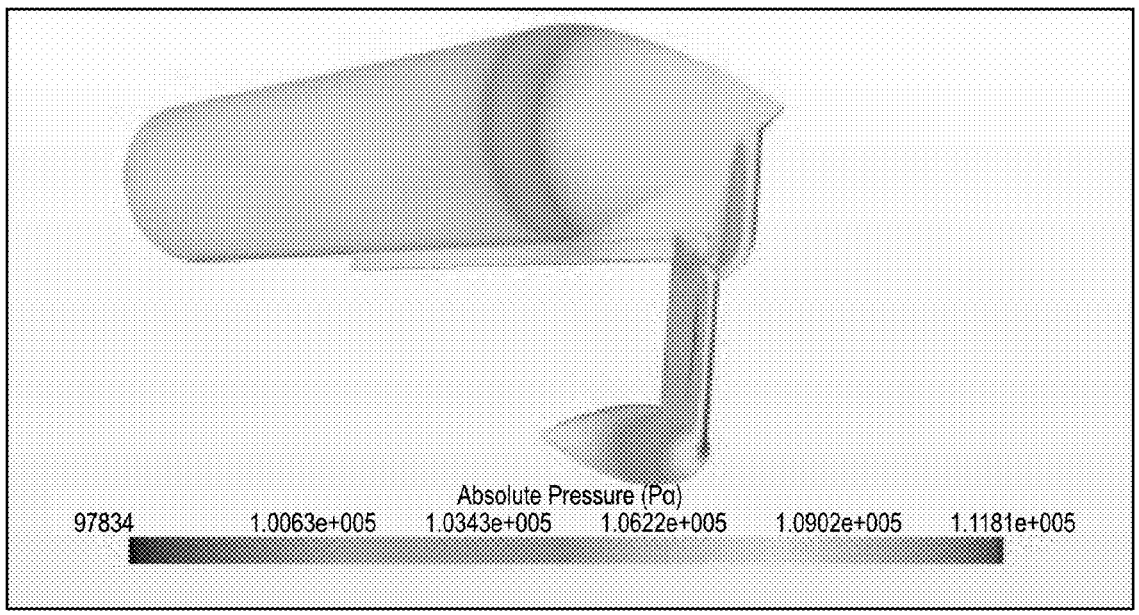
FIG. 17 is a perspective view showing the pressure on the case at 6 and 8 knots.
Figure 17:
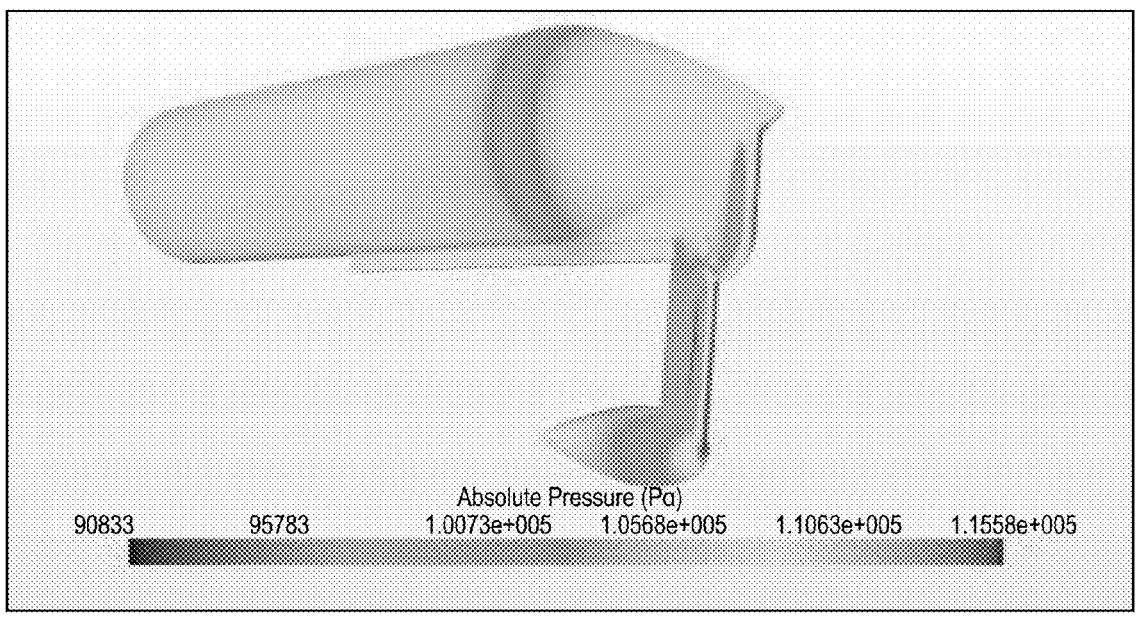
Figure 18:
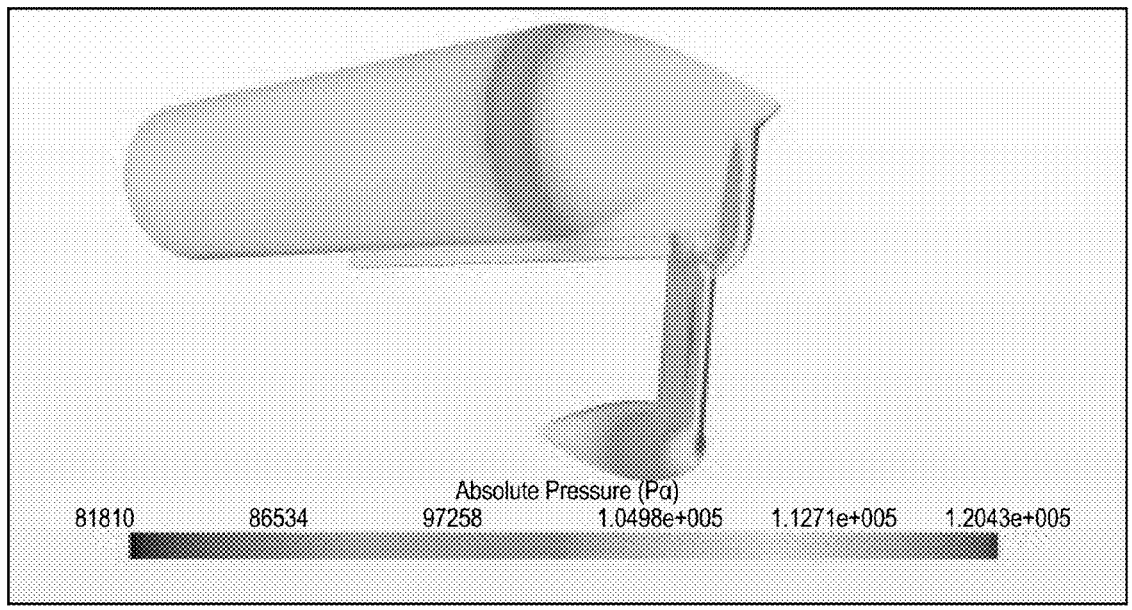
FIG. 18 is a perspective view showing the pressure on the case at 10 and 12 knots.
Figure 18:
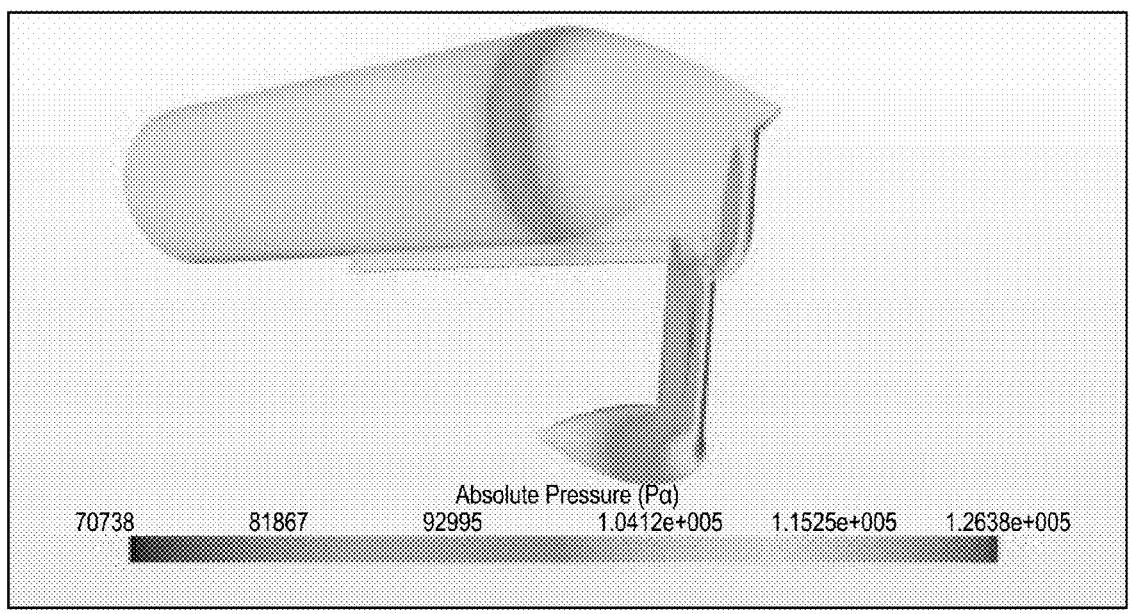

FIGS. 16-18 show the pressure on the case at various speeds from 2-12 knots, where darker areas indicate a lower pressure. As shown, the pressure on the main body is uniformly low at 2 knots, but increases as the speed is increased, as expected. The main concentrations of pressure are on the front cap and along the main body.

Figure 19:
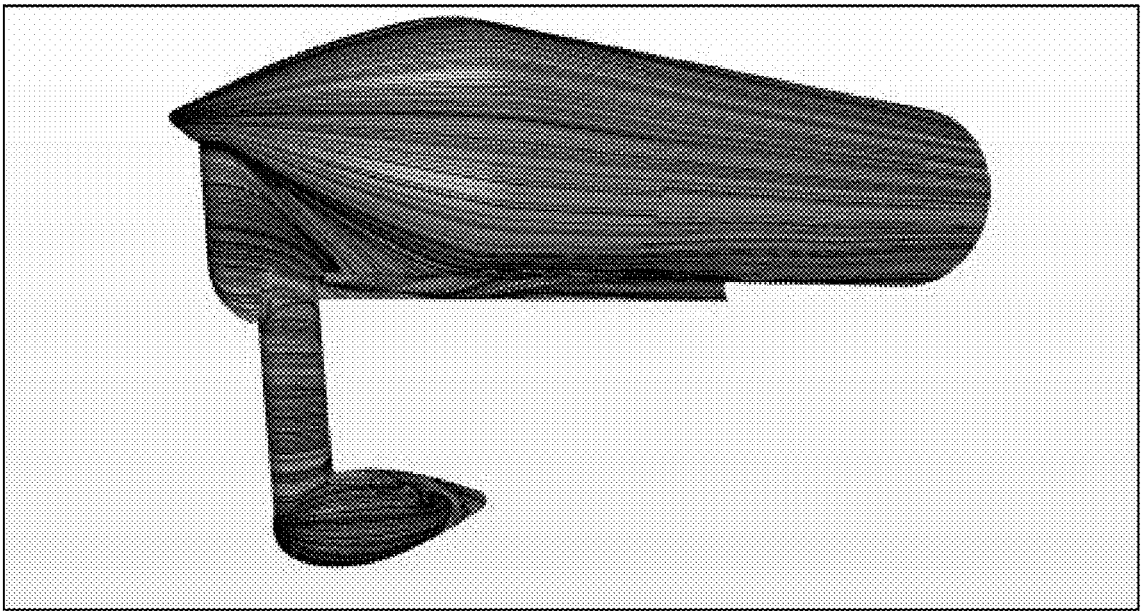
FIG. 19 is a perspective view showing constrained streamlines on the case at 2 and 4 knots.
Figure 19:
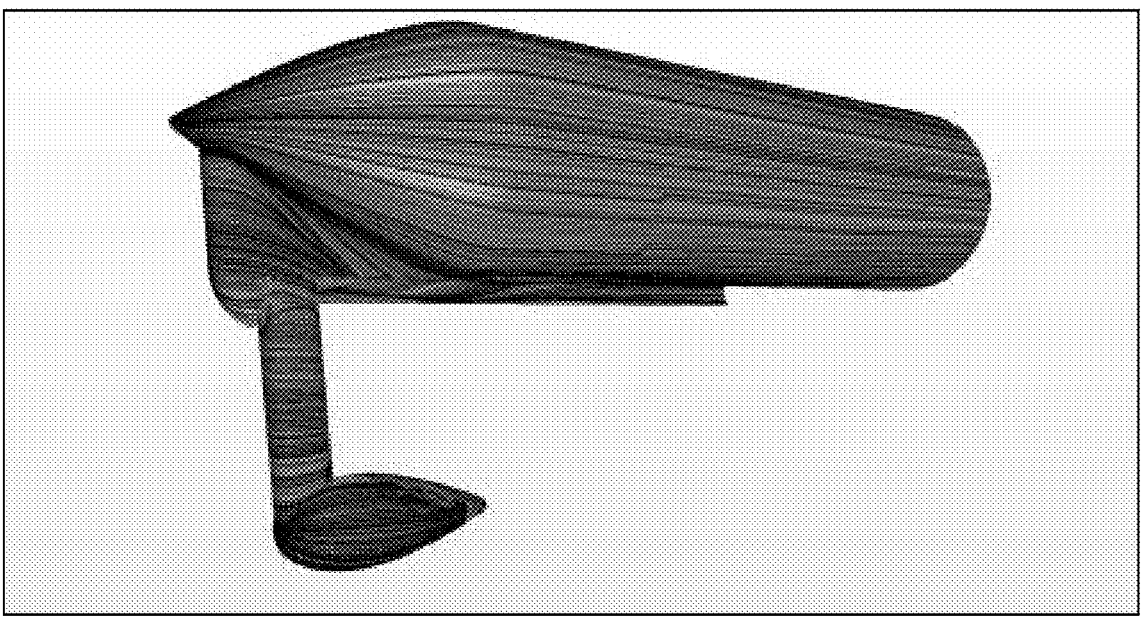
Figure 20:
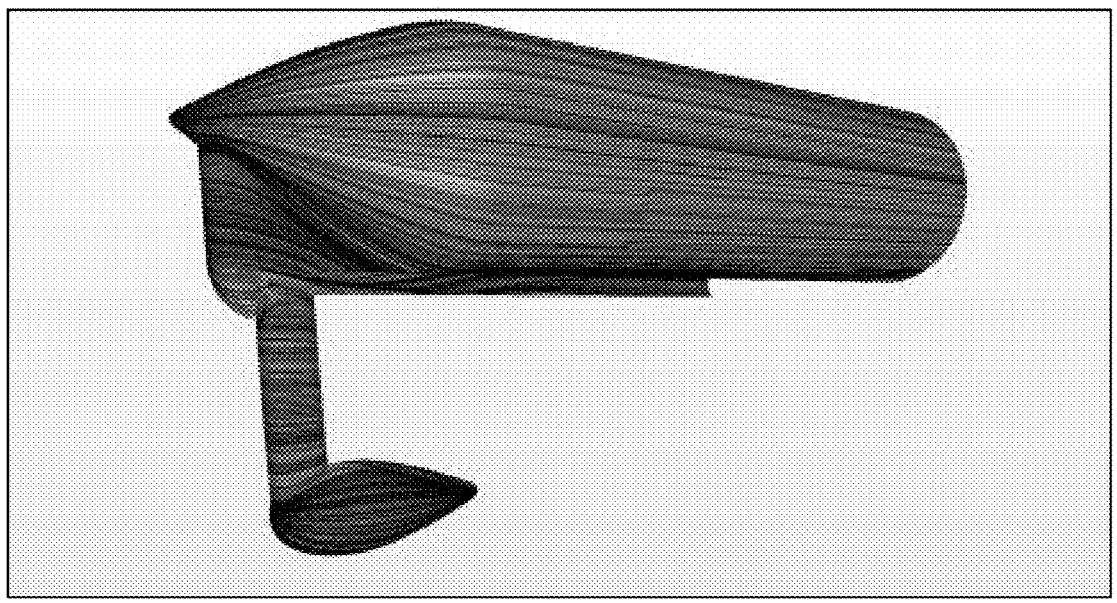
FIG. 20 is a perspective view showing constrained streamlines on the case at 6 and 8 knots.
Figure 20:
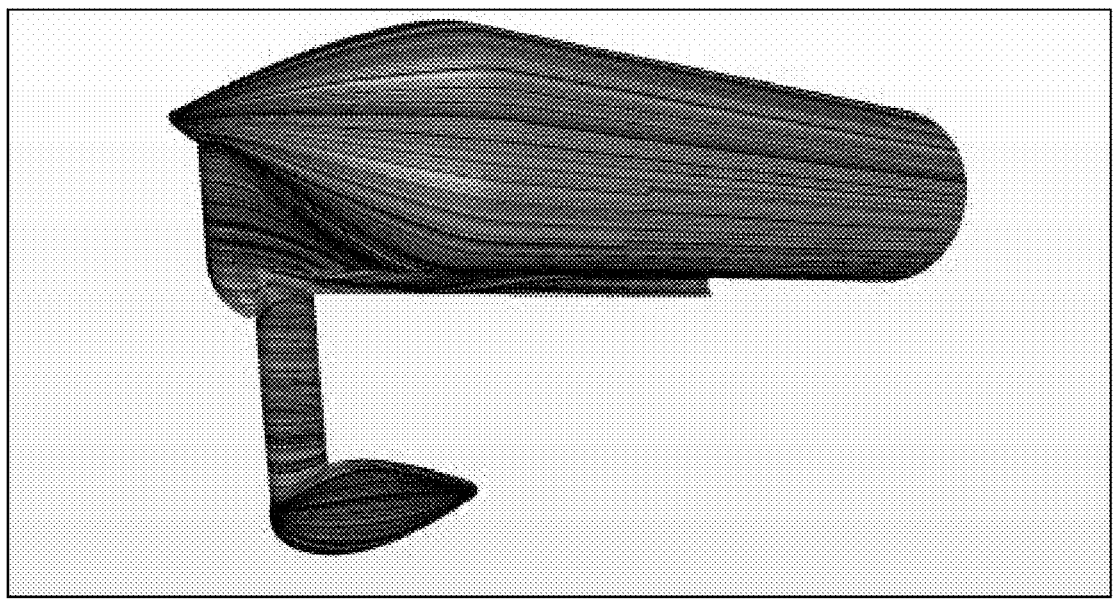
Figure 21:
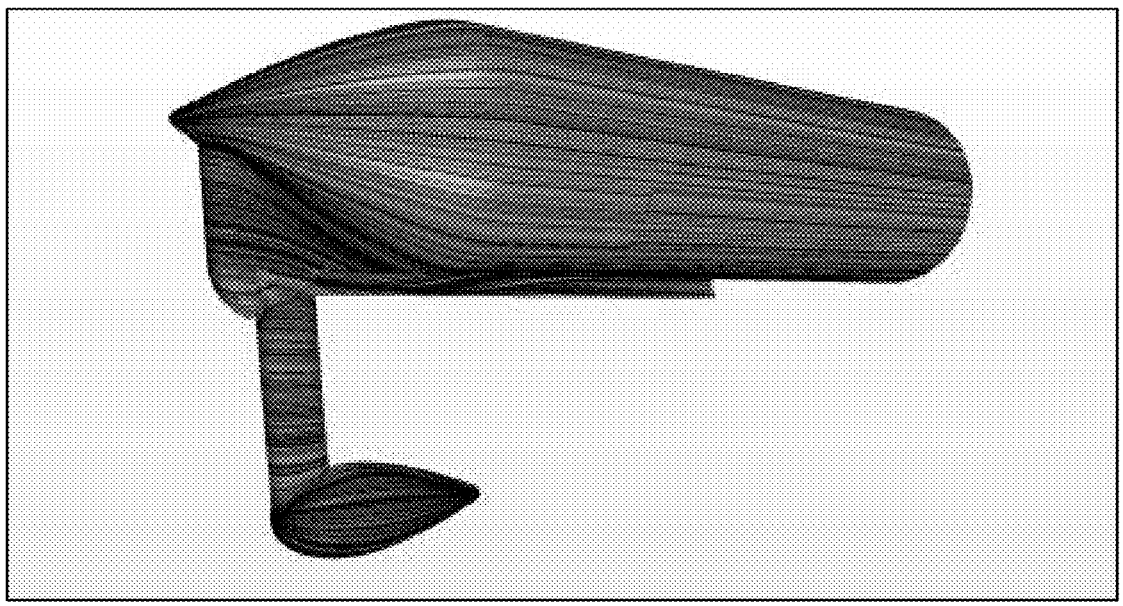
FIG. 21 is a perspective view showing constrained streamlines on the case at 6 and 8 knots.
Figure 21:
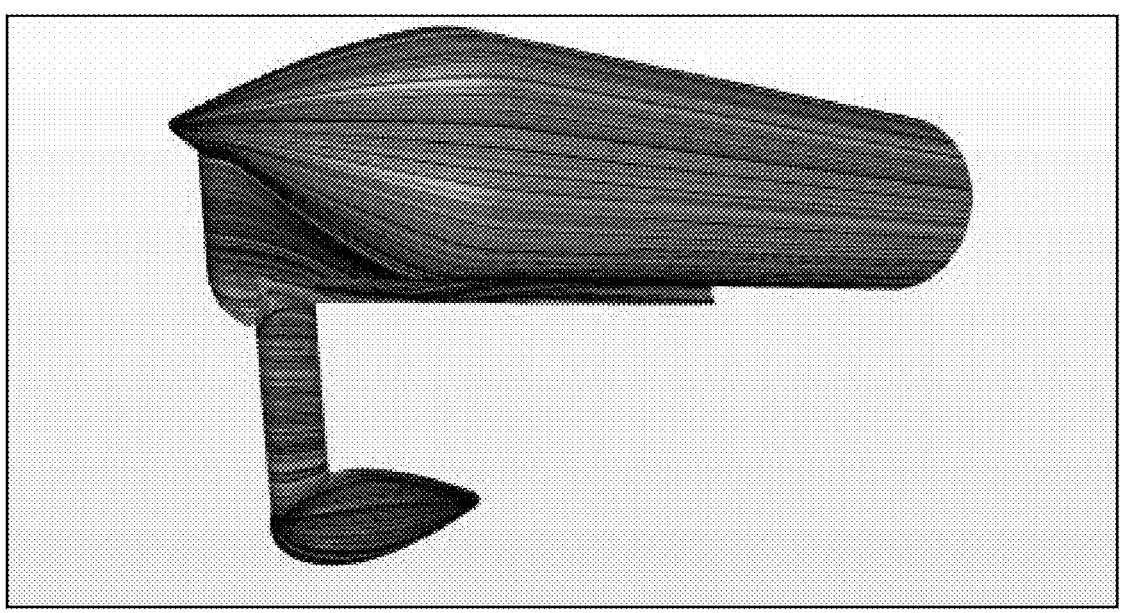

FIGS. 19-21 show constrained streamlines on the case at speeds from 2-12 knots. These images show the path that fluid takes as the assembly traverses the water. As shown, the streamlines are fairly uniform as speed increases, with small areas of sharp concentration at 2 knots diffusing to a normal distribution as the speed is increased.

Although described with respect to an underwater camera for fishing, the presently disclosed system may be used in other underwater application such as scuba diving or surfing, applications in which the improved hydrodynamic properties facilitate use of the camera underwater. In yet other embodiments, the presently disclosed system may be used in non-underwater applications. In one embodiment, the line attachment system described above may be used to secure the camera to a kite string. Similar to a fishing line, the kite string or a section of the kite string forms a continuous filament to which the camera system may be attached. The same configuration of the camera that provides desired hydrodynamic performance when towed underwater may also provide improved aerodynamic performance when deployed in the air. Using the camera system attached to a kite or other airborne device may provide an efficient ad low cost method of aerial observation as compared to prior options involving remote controlled devices.

While the invention has been described with reference to certain embodiments it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments falling within the scope of the claims as allowed.

What is claimed:

1. An underwater camera comprising:
a camera having a lens disposed within a water proof main body, the main body having a hydrodynamic exterior profile, a lens aperture, and a rail extending along at least a portion of the length of the main body and defining a line channel configured to receive a continuous filament,
a line attachment system attachable to the main body and configured to secure the main body to a continuous section of a filament such that the underwater camera is capable of sliding along the continuous filament, and
a centerboard in sliding engagement with the rail such that the centerboard is user-adjustable along the length of the rail, the centerboard extending downwardly from the main body and configured to stabilize the underwater camera when moving through the water, the centerboard further being removable to allow a continuous filament in the channel and reattachable to secure the continuous filament in the line channel such that the underwater camera is secured to the continuous filament without breaking the continuous filament,
wherein the underwater camera is user-configurable to exert approximately zero net lift on a fishing lure secured to an end of the continuous filament at speeds in a range of 2-15 knots when submerged.

2. The underwater camera of claim 1, wherein the water proof main body is configured to be pulled through the water in a first direction, and the lens aperture is oriented in a second direction opposite the first direction.

3. The underwater camera of claim 1, wherein the continuous filament is a fishing line.

4. The underwater camera of claim 1, wherein the main body is monolithic and forms a sealed enclosure for the camera.

5. The underwater camera of claim 1, wherein the line attachment system comprises at least two releasable clamps configured to secure the underwater camera to the continuous filament without breaking the continuous filament.

6. The underwater camera of claim 5, wherein each of the at least two clamps comprise a hook configured to receive the continuous filament in an open position, and an elastic clip configured to secure the hook in a closed position to retain the continuous filament.

7. The underwater camera of claim 5, wherein the at least two clamps are connected to the top of the main body.

8. An underwater camera comprising:
a camera having a lens disposed within a waterproof main body, the main body having a hydrodynamic exterior profile, a lens aperture, and a rail extending along at least a portion of the length of the main body and defining a line channel configured to receive a continuous filament,
a line attachment system configured to secure the main body to a continuous section of a filament without breaking the continuous filament such that the underwater camera is capable of sliding along the continuous filament,
wherein the line attachment system comprises at least two clamps configured to secure the underwater camera to the continuous filament, and
a centerboard in sliding engagement with the rail such that the centerboard is user-adjustable along the length of the rail, the centerboard extending downwardly from the main body and configured to stabilize the underwater camera when moving through the water, the centerboard further being removable to allow a continuous filament in the channel and reattachable to secure the continuous filament in the line channel such that the underwater camera is secured to the continuous filament without breaking the continuous filament
wherein the at least two clamps comprise a first clamp connected to a cap configured to be secured to the water proof main body, and a second clamp connected to a back frame assembly configured to be secured to the water proof main body opposite the cap.

9. The underwater camera of claim 1, wherein the line attachment system comprises
a line channel extending along at least a portion of the length of the main body, the line channel configured to receive the continuous filament, and
a sled configured to be slidably received in the line channel to secure the underwater camera to the continuous filament.

10. The underwater camera of claim 1 further comprising: a cap configured to be secured to the water proof main body.

11. The underwater camera of claim 10, wherein the water proof main body further comprises a threaded connector configured to receive the cap.

12. The underwater camera of claim 10, wherein the cap has a hydrodynamic profile configured to facilitate movement of the underwater camera under water.

13. The underwater camera of claim 1 further comprising: a frame assembly configured to be secured to the main body adjacent the lens aperture of the main body.

14. The underwater camera of claim 13, wherein the frame assembly is further configured to support an accessory over the lens aperture.

15. The underwater camera of claim 13, wherein the frame assembly is further configured to support a filter over the lens aperture of the main body to filter light incident upon the lens of the camera.

16. The underwater camera of claim 1, wherein the water proof main body is water proof to at least 100 meters.

17. The underwater camera of claim 8, wherein the hydrodynamic exterior profile of the main body induces laminar flow of water along the main body at 12 knots.

18. The underwater camera of claim 8, wherein the underwater camera is stable at a speed of 12 knots when submerged.

19. The underwater camera of claim 8, wherein the underwater camera is hydrodynamically stable at a speed of 12 knots when submerged.

20. The underwater camera of claim 1, wherein the centerboard includes a user-adjustable weight.

21. The underwater camera of claim 1 further comprising:
a rechargeable energy storage device within the main body and operatively connected to the camera, and
a generator configured to generate electricity responsive to movement of the system through a fluid to charge the rechargeable energy storage device, wherein the generator comprises: at least one stator disposed within an interior of the main body, and operatively connected to the rechargeable energy storage device, and at least one rotor exterior to the main body, wherein the at least one rotor is magnetically coupled to the at least one stator.

22. The underwater camera of claim 1 further comprising:
a processor including instructions configured to control operation of the camera and other electronic devices within the main body, and
a memory in communication with the processor configured to store captured images or video from the camera as recorded data.

23. The underwater camera of claim 22 further comprising:
an optical transmitter configured to transmit the recorded data to an optical receiver external to the main body.

24. The underwater camera of claim 22 further comprising:
a magnetically operated switch operatively connected to the processor and configured to activate or deactivate the camera responsive to proximity of a magnet.

25. The underwater camera of claim 22 further comprising: an light sensor configured to detect ambient light, and
a light source configured to illuminate at least a portion of a viewing angle of the lens of the camera responsive to detecting ambient light below a threshold.

26. The underwater camera of claim 22 further comprising:
a microphone, and wherein the memory is further configured to store captured audio data from the microphone as recorded data.

27. The underwater camera of claim 22, wherein the processor includes instructions further configured to:
save an operational state of the camera prior to a power loss, and
restore the operational state of the camera and resume recording after power is restored.

28. An underwater camera comprising:
a camera having a lens disposed within a waterproof main body, the main body having a hydrodynamic exterior profile, a lens aperture, and a rail extending along at least a portion of the length of the main body and defining a line channel configured to receive a continuous filament,
a line attachment system configured to secure the main body to a continuous section of a filament such that the underwater camera is capable of sliding along the continuous filament,
a processor including instructions configured to control operation of the camera and other electronic devices within the main body,
a centerboard in sliding engagement with the rail such that the centerboard is user-adjustable along the length of the rail, the centerboard extending downwardly from the main body and configured to stabilize the underwater camera when moving through the water, the centerboard further being removable to allow a continuous filament in the channel and reattachable to secure the continuous filament in the line channel such that the underwater camera is secured to the continuous filament without breaking the continuous filament, and
a memory in communication with the processor configured to store captured images or video from the camera as recorded data, wherein the processor includes instructions further configured to: determine a path followed by the underwater camera using a geolocation device when the underwater camera is out of the water, and a three-axis accelerometer when the underwater camera is submerged.

29. The underwater camera of claim 28, wherein the geolocation device is a Global Positioning System receiver.

30. The underwater camera of claim 22 further comprising:
a three-axis accelerometer operatively connected to the processor and configured to detect acceleration in three directions.

31. The underwater camera of claim 30, wherein the processor includes instructions further configured to: identify fish strikes responsive to the detected acceleration and annotate the captured images or video with a time and date responsive to the identified fish strikes.

32. The underwater camera of claim 30, wherein the processor includes instructions further configured to: trigger recording of captured images or video from the camera responsive to detected acceleration.

33. The underwater camera of claim 30, wherein the processor includes instructions further configured to: determine a path a travel of the underwater camera based upon detected acceleration.

34. An underwater camera comprising:
a camera having a lens disposed within a waterproof main body, the main body having a hydrodynamic exterior profile and a lens aperture,
a line attachment system configured to secure the main body to a continuous section of a filament such that the underwater camera is capable of sliding along the continuous filament,
a processor including instructions configured to control operation of the camera and other electronic devices within the main body, and
a memory in communication with the processor configured to store captured images or video from the camera as recorded data,
wherein the processor includes instructions further configured to:
receive a unique device identifier, time and date settings, and an expiration time, annotate captured images and videos with the unique device identifier, and a current time and date, until the expiration time, and
prevent annotation of captured images and videos with the unique device identifier if the instructions are altered prior to the expiration time.

35. The underwater camera of claim 34, wherein the processor includes instructions further configured to: prevent the underwater camera from accepting new instructions until after the expiration time.

36. The underwater camera of claim 28, wherein the underwater camera is user-configurable to exert approximately zero net lift on a fishing lure secured to an end of the continuous filament at speeds in a range of 2-15 knots when submerged.

37. The underwater camera of claim 28, wherein the main body is configured to be pulled through the water in a first direction, and the lens aperture is oriented in a second direction opposite the first direction.

38. The underwater camera of claim 28, wherein the line attachment system comprises at least two clamps configured to secure the underwater camera to the continuous filament.

39. The underwater camera of claim 34, wherein the underwater camera is hydrodynamically stable at a speed of 12 knots when submerged.

40. The underwater camera of claim 34, wherein the main body is configured to be pulled through the water in a first direction, and the lens aperture is oriented in a second direction opposite the first direction.

41. The underwater camera of claim 34, wherein the line attachment system comprises at least two clamps configured to secure the underwater camera to the continuous filament.

* * * * *